United States Patent
Galeazzi et al.

(10) Patent No.: US 8,714,128 B2
(45) Date of Patent: *May 6, 2014

(54) CYLINDER HEAD FOR AN INTERNAL COMBUSTION ENGINE, WITH INTEGRATED EXHAUST MANIFOLD AND SUBGROUPS OF EXHAUST CONDUITS MERGING INTO MANIFOLD PORTIONS WHICH ARE SUPERIMPOSED AND SPACED APART FROM EACH OTHER

(75) Inventors: Giampaolo Galeazzi, Turin (IT); Antonio Abozzi, Turin (IT); Carmelo D'Anna, Turin (IT)

(73) Assignee: Fiat Powertrain Technologies S.p.A., Turin (IT)

( * ) Notice: Subject to any disclaimer, the term of this patent is extended or adjusted under 35 U.S.C. 154(b) by 279 days.

This patent is subject to a terminal disclaimer.

(21) Appl. No.: 13/306,573

(22) Filed: Nov. 29, 2011

(65) Prior Publication Data
US 2012/0227687 A1  Sep. 13, 2012

(30) Foreign Application Priority Data
Mar. 10, 2011  (EP) .................................... 11157719

(51) Int. Cl.
*F02F 1/00* (2006.01)
(52) U.S. Cl.
USPC ................... 123/193.5; 123/41.82 R; 60/321; 60/323
(58) Field of Classification Search
USPC ................... 123/193.5, 41.82 R; 60/321, 323
See application file for complete search history.

(56) References Cited

U.S. PATENT DOCUMENTS

| | | | |
|---|---|---|---|
| 4,993,227 A | 2/1991 | Nagura et al. | |
| 6,799,540 B2* | 10/2004 | Akiwa et al. | 123/41.82 R |
| 7,784,442 B2* | 8/2010 | Lester et al. | 123/193.5 |
| 7,849,683 B2* | 12/2010 | Asame et al. | 60/323 |

(Continued)

FOREIGN PATENT DOCUMENTS

| | | |
|---|---|---|
| DE | 2508952 A1 | 10/1976 |
| DE | 10 2008 029 020 A1 | 12/2009 |
| EP | 2172635 A1 | 4/2010 |
| JP | 2006329128 A | 12/2006 |

OTHER PUBLICATIONS

1st Office Action, issued Jan. 30, 2013, for corresponding European application No. 11157719.3.

(Continued)

*Primary Examiner* — M. McMahon
(74) *Attorney, Agent, or Firm* — Heslin Rothenberg Farley & Mesiti P.C.; Victor A. Cardona, Esq.

(57) ABSTRACT

A cylinder head for an internal combustion engine has a body integrating, in a single cast piece, an exhaust manifold and including a lower cooling jacket and an upper cooling jacket, The lower cooling jacket is longitudinally divided into a plurality of separate transverse chambers associated to various engine cylinders, while the upper cooling jacket has a portion extending longitudinally over the entire development of the head and communicating with separate transverse chambers located on the intake side of the head. The exhaust conduits integrated in the head form separate subgroups of exhaust conduits merging into manifold portions superimposed and spaced apart from each other. The lower cooling jacket has a portion thereof which extends in the area of the body of the head which separates the superimposed portions of the abovementioned subgroups of exhaust conduits.

2 Claims, 16 Drawing Sheets

(56) References Cited

U.S. PATENT DOCUMENTS

| | | | |
|---|---|---|---|
| 8,061,131 B2 * | 11/2011 | Kuhlbach | 60/323 |
| 8,474,251 B2 * | 7/2013 | Beyer et al. | 60/321 |
| 2008/0308050 A1 * | 12/2008 | Kuhlbach et al. | 123/41.82 R |
| 2009/0126659 A1 | 5/2009 | Lester et al. | |
| 2009/0241526 A1 | 10/2009 | Son et al. | |
| 2010/0083920 A1 | 4/2010 | Kuhlbach | |

OTHER PUBLICATIONS

European Search Report for corresponding European application No. 11157719.3, mailed Aug. 22, 2011.

* cited by examiner

CYLINDER HEAD FOR AN INTERNAL COMBUSTION ENGINE, WITH INTEGRATED EXHAUST MANIFOLD AND SUBGROUPS OF EXHAUST CONDUITS MERGING INTO MANIFOLD PORTIONS WHICH ARE SUPERIMPOSED AND SPACED APART FROM EACH OTHER

CROSS REFERENCE TO RELATED APPLICATIONS

This application claims priority from European patent application No. EP 1157719.3 filed on Mar. 10, 2011, the entire disclosure of which is incorporated herein by reference.

FIELD OF THE INVENTION

The present invention refers to cylinder heads for internal combustion engines of the type having:
- a body with an upper face, a lower face, two end faces and two lateral faces,
- said body integrating in a single cast piece, the engine exhaust manifold,
- said exhaust manifold being defined by a plurality of conduits for the exhaust gases provided in the body of the head, said conduits merging into a common outlet terminating on a lateral face of the head, and
- at least one lower cooling jacket and at least one upper cooling jacket provided in the body of the head, substantially below and above conduits defining the exhaust manifold.

PRIOR ART

Cylinder heads of the previously described type gave been known over the years. A cylinder head of this type, intended in particular for a turbocharged internal combustion engine, is described in document U.S. Pat. No. 4,993,227.

The integration of the exhaust manifold in the cylinder head allows a construction simplification and also a reduction of the manufacturing costs, given that in the conventional engines with separate exhaust manifold the latter must be made of precious steel to bear the high operating temperatures, while in the cylinder heads with integrated manifold the material constituting the head and the manifold is typically aluminium, and the problem deriving from the high temperatures of the exhaust gases is resolved by providing a liquid cooling for the manifold and the head, through the abovementioned cooling jackets.

As indicated above, document U.S. Pat. No. 4,993,227 shows a solution of this type used for a turbocharged engine, in which the integration of the exhaust manifold in the head allows mounting a turbocharger unit on the face of the head in which the abovementioned common outlet of the exhaust gases terminates. In the abovementioned prior art solution, the lower cooling jacket receives cooling fluid coming from conduits provided in the engine block through a plurality of access openings provided on the lower face of the head and distributed along the entire longitudinal dimension of the head. The cooling fluid is freely distributed in the lower cooling jacket over the entire longitudinal dimension thereof and then reaches the upper jacket through a plurality of conduits, also distributed over the entire longitudinal direction of the head. In the upper jacket of reference the fluid is also distributed freely through the entire longitudinal dimension of the head until it merges together with the fluid which passes through the lower cooling jacket into an outlet provided adjacent to an end of the head.

A substantially similar solution is also described in document US2009/0126659A1. The only substantial difference between the solution described in such second document and the one described in U.S. Pat. No. 4,993,227 lies in the fact that in the case of the second document the lower cooling jacket and the upper cooling jacket are substantially separate with respect to each other over the entire longitudinal dimension of the head and they receive the cooling liquid mainly from inlet openings arranged at an end of the head, so that the cooling liquid passes through—parallel—the two lower and upper cooling jackets over the entire longitudinal direction and then exits through an opening provided at the opposite end of the head, which is in communication with both cooling jackets.

A drawback of the prior art solutions described above lies in the fact that the lower and upper cooling jackets are substantially traversed each by a longitudinal flow of a cooling fluid, from one end of the head to the other, which does not guarantee an ideal and uniform cooling of all the portions of the head associated to engine cylinders.

OBJECT OF THE INVENTION

The object of the present invention is that of providing a cylinder head of the type indicated at the beginning of the present description where the abovementioned drawback is overcome and particularly where an optimal and uniform cooling of the portions of the head is guaranteed and in particular the cooling of the various portions of the exhaust manifold, associated to the various engine cylinders.

A further object of the invention is that of reducing the overheating to which the exhaust conduits associated to the engine cylinders are subjected to and the non-uniformities of such overheating between different exhaust conduits to the maximum.

SUMMARY OF THE INVENTION

With the aim of attaining such object, the invention aims at providing a cylinder head of the type indicated at the beginning of the present description and characterised in that:
a) the cooling jacket is longitudinally divided into a plurality of separate transverse chambers associated to various engine cylinders, while the upper cooling jacket has a portion extended longitudinally over the entire extension of the head and communicating with separate transverse chambers located above the combustion chambers of the head,
b) said exhaust conduits integrated in the head form separate subgroups of exhaust conduits merging into manifold portions superimposed and spaced apart from each other,
c) said separate subgroups of exhaust conduits terminate in said common outlet on a lateral face of the cylinder head, and
d) the abovementioned lower cooling jacket has a portion thereof which is extended in the area of the body of the head which separates the superimposed portions of the abovementioned subgroups of exhaust conduits.

It should be observed that a cylinder head having the abovementioned characteristic (a) was previously proposed by the Applicant in the previous European patent application 10 425 161.6 thereof, still undisclosed as of date of priority of the present filing. The present invention makes reference to such previous proposal and combines it with the abovementioned further solutions, first of all providing subgroups of exhaust conduits merging into manifold portions superimposed and spaced apart from each other. The latter solution is per se known in the art (US 2010/0083920 A1, US 2009/0241526 A1) and allows advantages in terms of improved and more uniform cooling of the conduits also avoiding the gas-dynamic interaction between the conduits, typical of the solutions with a single and neared outlet of the gas from the cylinder head.

Due to the abovementioned characteristic (a), the head according to the invention ensures that the cooling fluid does not traverse the abovementioned cooling jackets longitudinally from one end of the head to the other, but it is at least partly forced to flow according to directions transverse to the longitudinal direction of the head, parallel in the various cooling chambers associated to different engine cylinders, hence ensuring a correct translation velocity of the cooling fluid, as well as—above all—a substantial cooling uniformity between the various portions of the cylinder head, and in particular of the exhaust manifold, associated to various engine cylinders.

The abovementioned advantages of improved and more uniform cooling of the cylinder head are enhanced further due to the characteristics (b-d).

BRIEF DESCRIPTION OF THE DRAWINGS

Further characteristics and advantages of the invention will be clear from the following description with reference to the attached drawings, provided purely by way of non-limiting example, wherein.

DETAILED DESCRIPTION OF A PREFERRED EMBODIMENT

Figure 1:
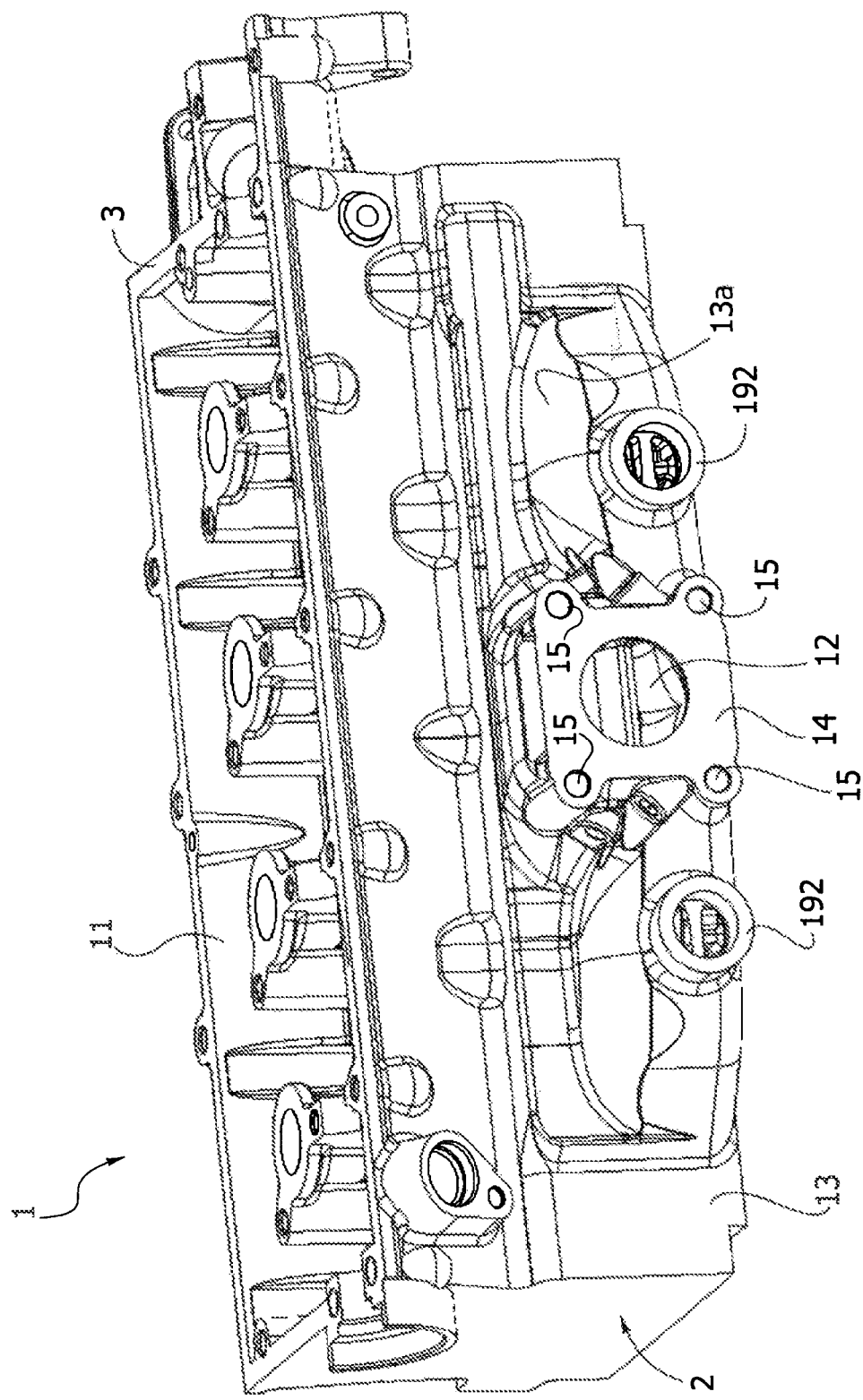
FIG. 1 is a perspective view of a cylinder head according to the invention.

The illustrated example refers to the case of the cylinder head of a turbocharged internal combustion engine, with four in-line cylinders. It is however clear that the present invention may be applied to any other type of engine, with any number of cylinders and both in cases where a turbo-supercharger unit is provided for and in cases where such unit is not provided for.

Referring to FIGS. 1-11, number 1 indicates—in its entirety—a cylinder head according to the invention, having a single aluminium body 2 with an upper face 3, a lower face 4 (see FIG. 3), a first end face 5 and a second end face 6.

Figure 2:
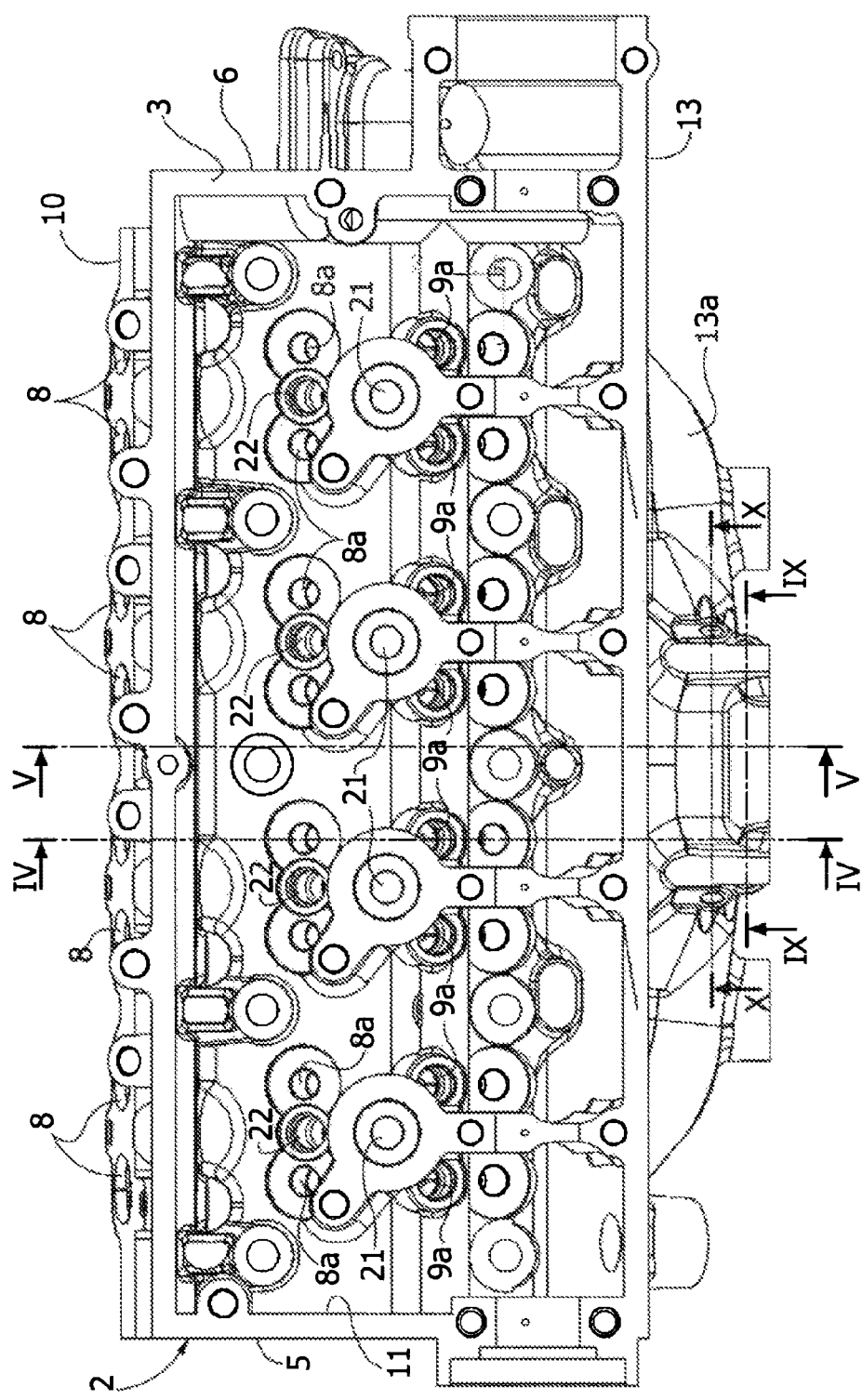
FIG. 2 is a plan view of the cylinder head of the FIG. 1.

Cavities 7 (see FIGS. 4, 5) defining the combustion chambers associated to engine cylinders are formed in the lower face 4 of the cylinder head. The illustrated example refers to the case of an engine provided with two intake valves and two exhaust valves for each engine cylinder. Therefore, two intake conduits 8 and two exhaust conduits 9 (see FIGS. 4, 6) are formed by casting, for each engine cylinder, in the body 2 of the cylinder head 1. The intake conduits 8 terminate on a longitudinal side face 10 of the head (see FIGS. 2, 5, 10). FIGS. 2, 7 also show the through holes 8a and 9a terminating—at the upper part—on the upper face 3 of the head and—at the lower part—in the respective intake and exhaust conduits 8, 9, intended to receive and guide the stems of the intake and exhaust valves. A cavity 11 intended to house one or more camshafts and the respective tappets for the actuation of the intake and exhaust valves is provided in the upper face of the head according to the conventional art.

Figure 6:
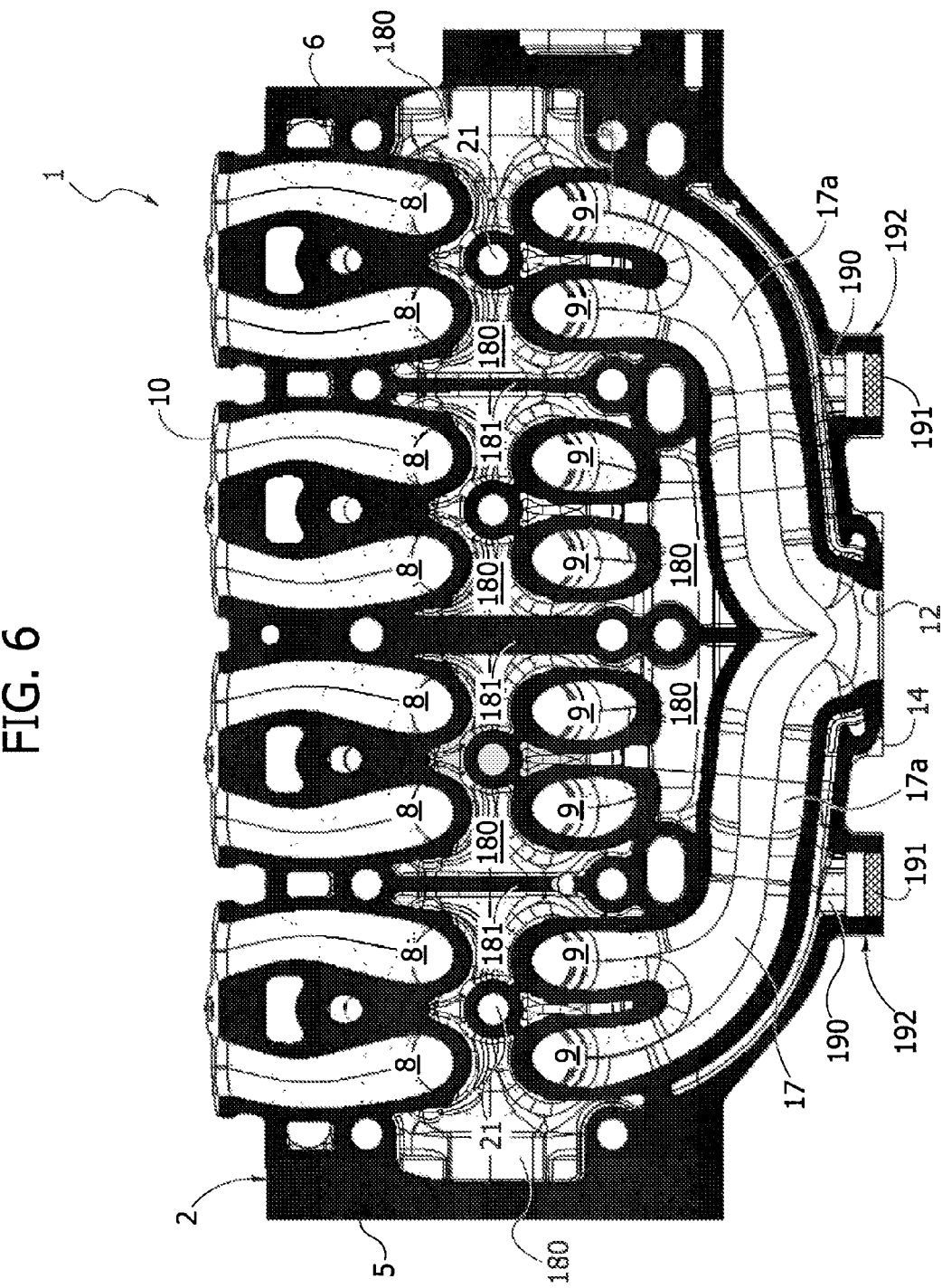
FIG. 6 is a sectional view according to line VI-VI of the FIG. 4.
Figure 7:
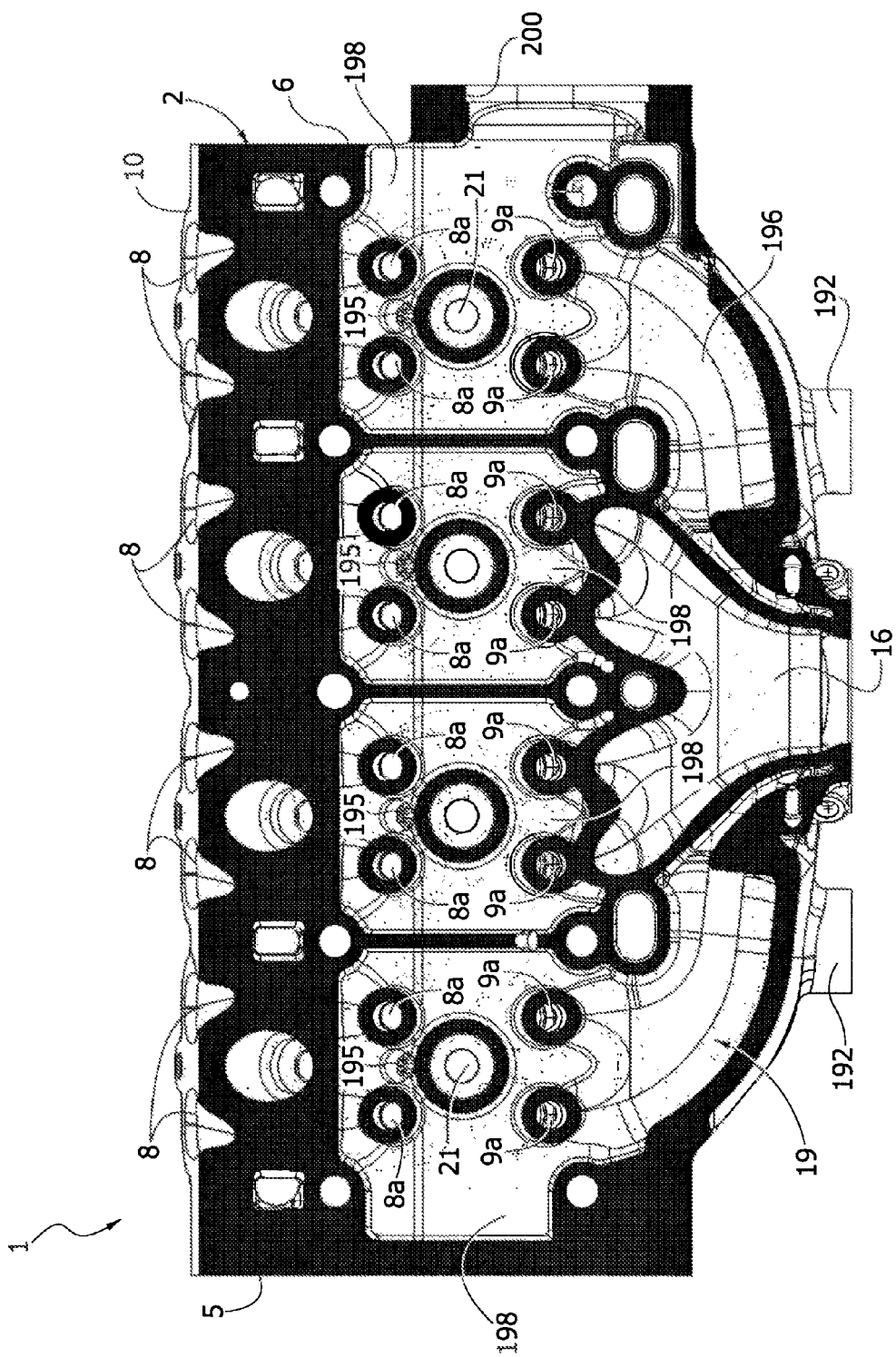
FIG. 7 is a sectional view according to line VII-VII of the FIG. 4.

As clearly observable in FIG. 6, the engine exhaust manifold is also provided in a single cast piece in the cylinder head 1. The overall configuration of the conduits defining the exhaust manifold corresponds to that of the core used for obtaining them, observable in FIG. 13 of the attached drawings. In such figure, the parts of the sand core corresponding to the cavities obtained in the cylinder head are indicated with the same reference number.

Figure 13:
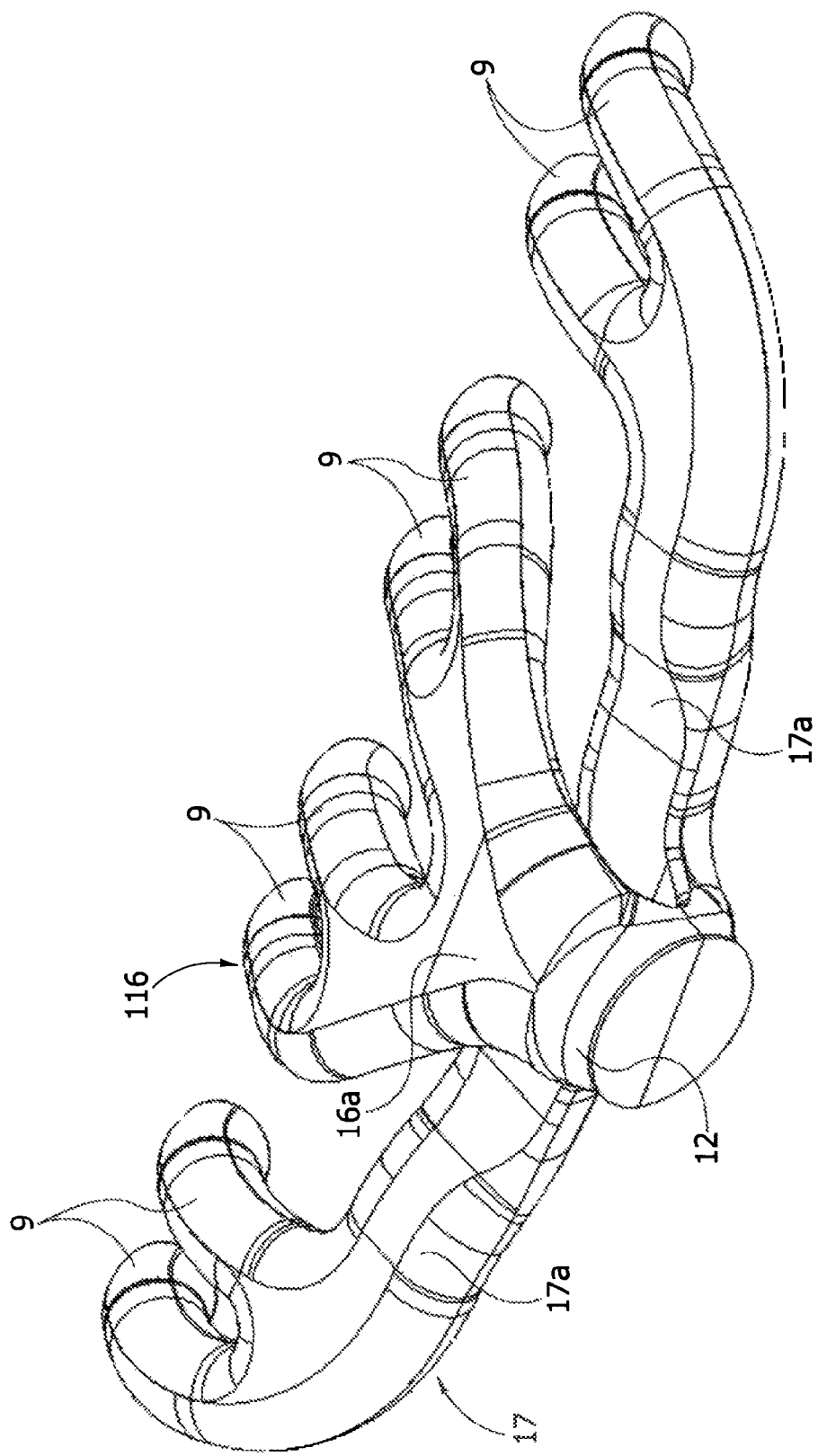
FIG. 13 is a perspective view, in assembled condition, of the two cores used for providing the exhaust conduits.

As observable in FIG. 13, all the exhaust conduits 9 merge into a common outlet 12 terminating on a longitudinal side face 13 of the cylinder head (FIG. 1) at a planar facet 14 bearing holes 15 for the engagement of screws for fastening the turbocharger unit (not illustrated). Returning to FIG. 13, the exhaust conduits 9 defining the exhaust manifold form two separate subgroups of exhaust conduits, respectively indicated with the reference numbers 16, 17. The subgroup 16 is constituted by the exhaust conduits 9 associated to the two engine cylinders which are at the centre of the aligned series of the four cylinders, while the subgroup 17 is constituted by the exhaust conduits 9 associated to the two cylinders which are at the ends of the series of cylinders. The exhaust conduits 9 of the first subgroup 16 mutually merge into a portion of manifold 16a which in turn merges at the outlet 12 with two conduits 17a part of the subgroup 17, into which the exhaust conduits 9 of each of the end cylinders merge. The conduits 17a extend in a direction substantially longitudinal with respect to the cylinder head, one towards the other, up to a central portion of manifold in which they merge together with the portion 16a within the common outlet 12.

As clearly observable in FIG. 13, the two subgroups of exhaust conduits 16, 17 merge into respective manifold portions which are at a position that is superimposed and spaced from each other, so that there extends a wall of the body of the cylinder head suitably cooled by providing (as observable hereinafter) a cavity for the circulation of the cooling liquid between the central portion 16a of the subgroup 16 and the central portion in which the two conduits 17a merge.

As indicated above, the provision of an exhaust manifold integrated in the body of the cylinder head, with the exhaust conduits forming subgroups of merging conduits separated, superimposed and spaced from each other, is known in the art (see US 2010/0083920 A1 and US 2009/0241526 A1). The present invention regards the specific application of such solution to a cylinder head of the type described herein. Furthermore, contrary to the known solutions, in the case of the invention the subgroups of exhaust conduits superimposed and spaced from each other however merge into a common outlet.

As observable in FIG. 1, in the case of the illustrated example, the portion of the cylinder head in which the exhaust manifold is integrated defines a part 13a projecting from the longitudinal side face 13.

Figure 4:
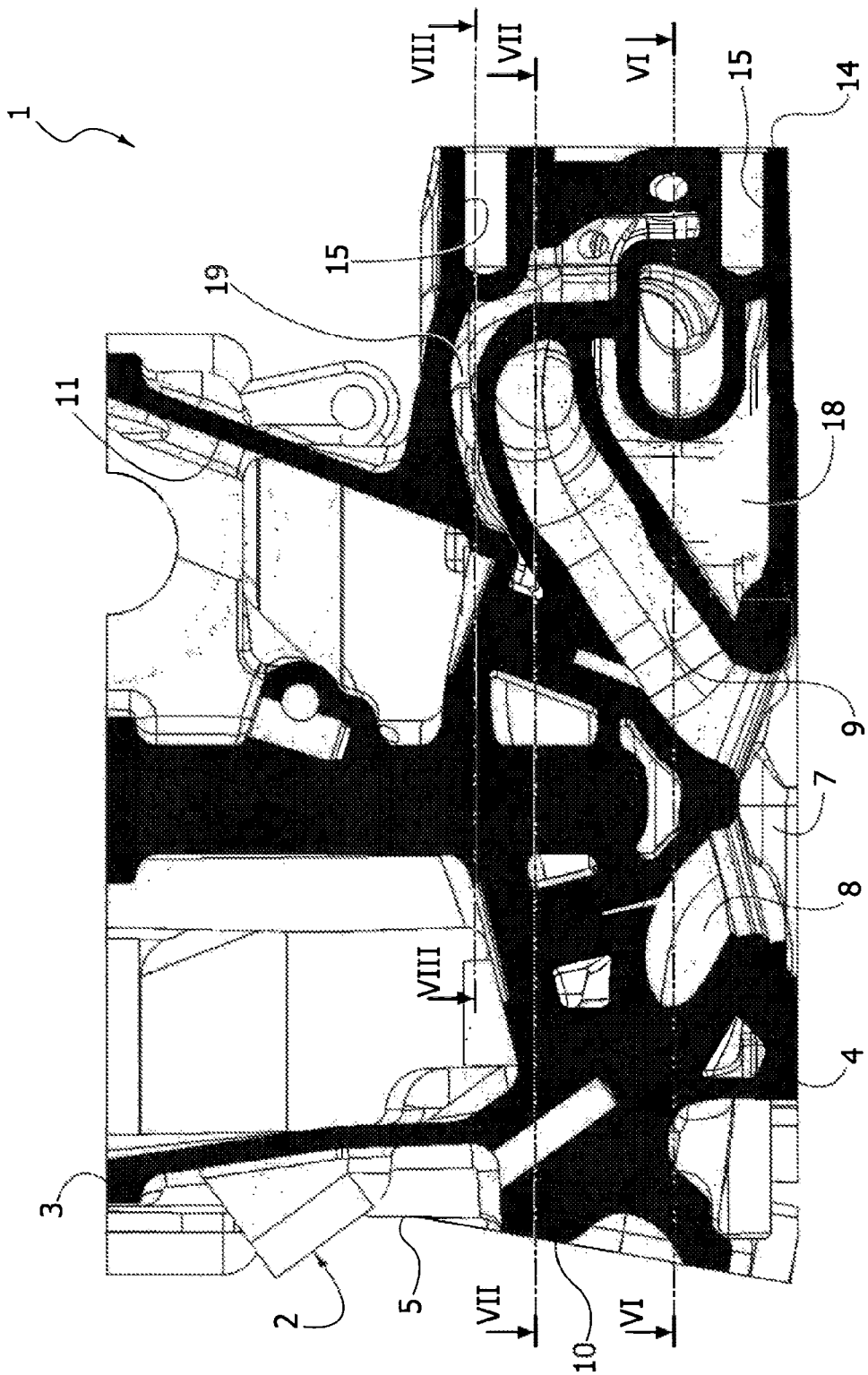
FIG. 4 is a sectional view according to line IV-IV of the FIG. 2.
Figure 5:
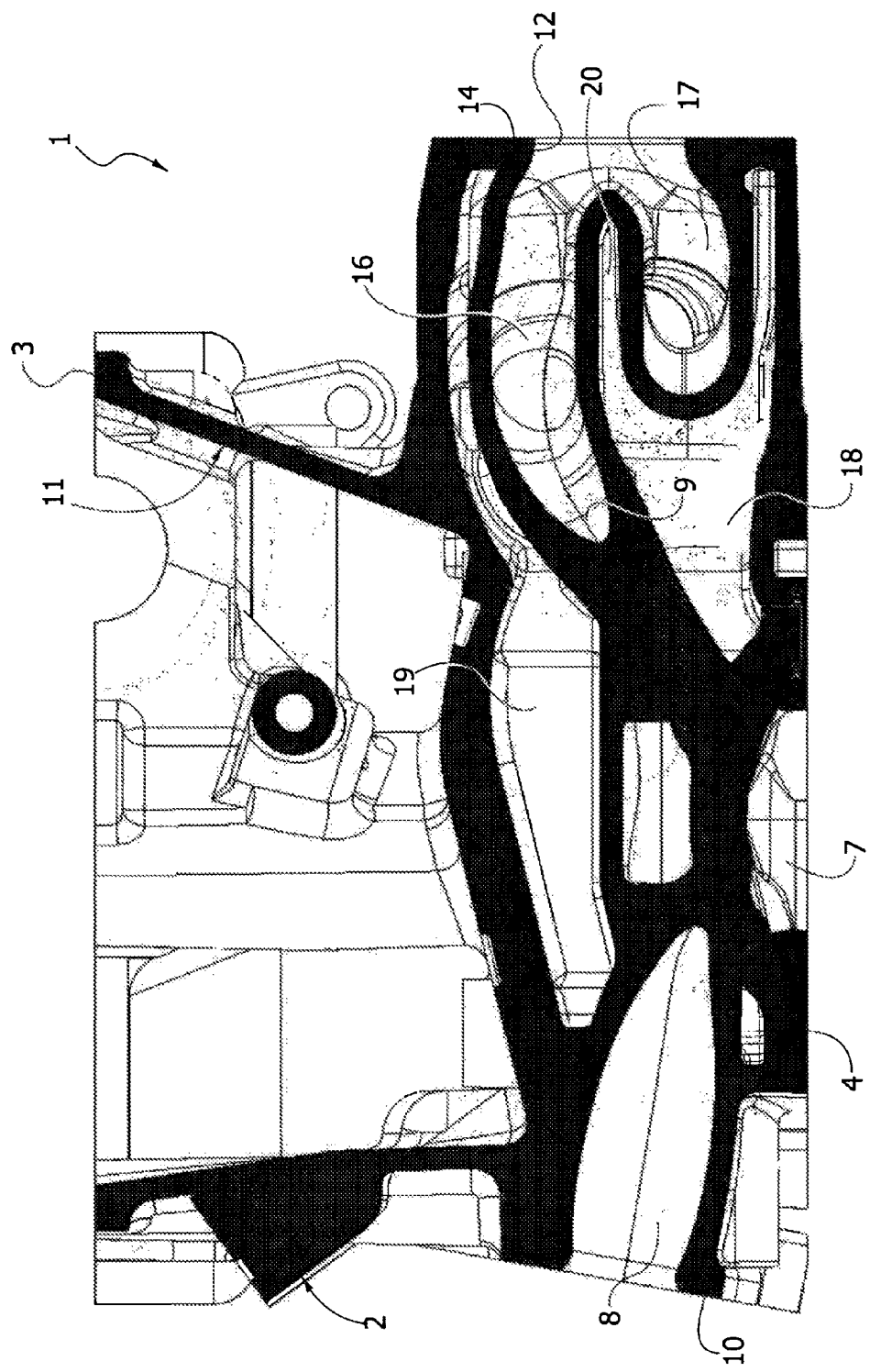
FIG. 5 is a sectional view according to line V-V of the FIG. 2.
Figure 14:
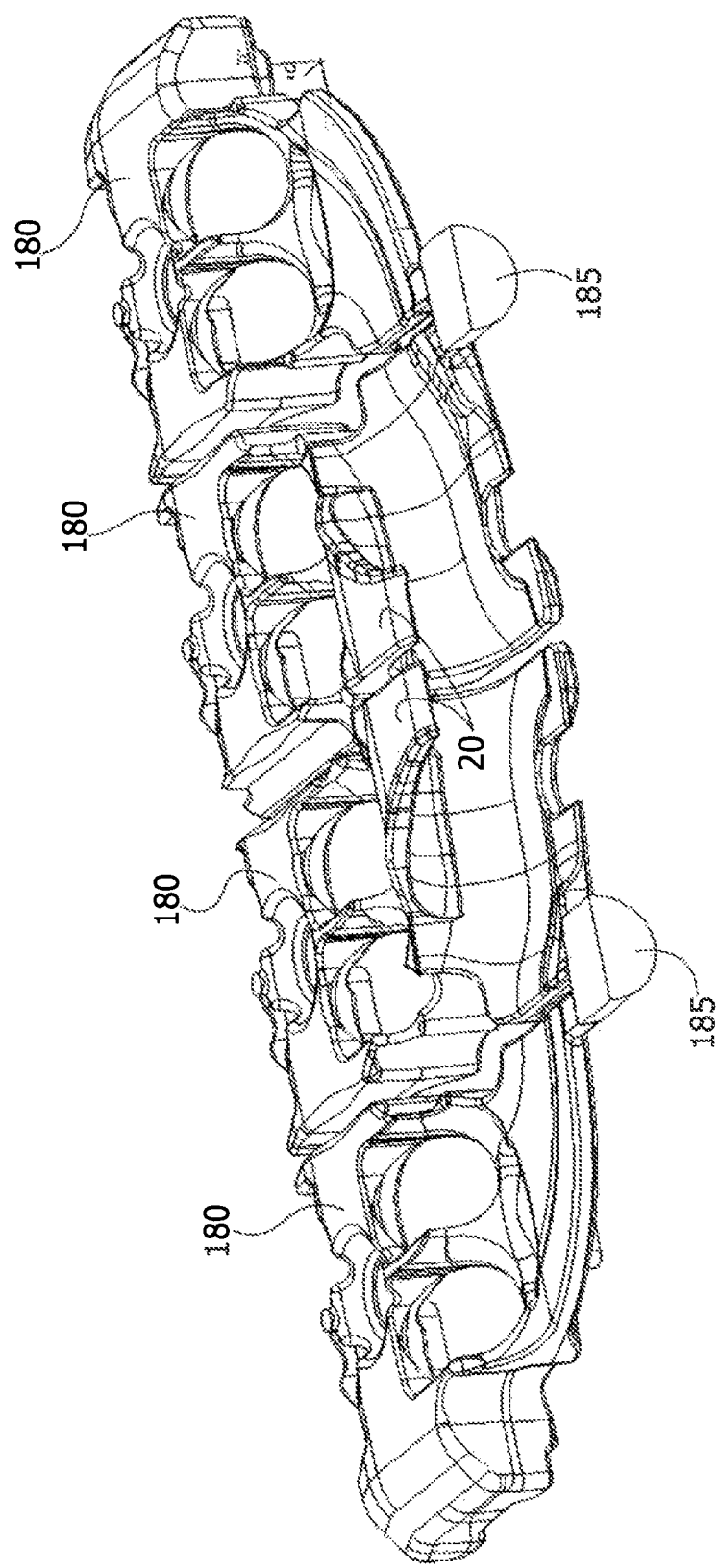
FIGS. 14, 15 are perspective views specifically illustrating the cores used for the lower cooling jacket and for the upper cooling jacket.

With particular reference to FIGS. 4, 5, lower and upper cooling jackets 18, 19, described in detail hereinafter, for cooling the head and in particular the exhaust manifold provided in the head are also formed by casting in the body of the cylinder head 1. The lower and upper cooling jackets 18, 19 are extended substantially above and below conduits defining the exhaust manifold, as well as around the central common outlet 12. The lower jacket 18 in particular also has a portion 20 extended in the wall which separates the central parts—which are superimposed and spaced apart from each other—of the subgroups of exhaust conduits 16, 17, such portion 20 of the lower cooling jacket 18 being obtained by providing the corresponding sand core having tab-like appendages which are indicated with the same reference number 20 in FIGS. 12, 14, 16.

In the drawings, reference number 21 indicates the conduits provided in the cylinder head for mounting the spark plugs associated to various engine cylinders, while reference number 22 indicates further conduits provided in the head to allow mounting injectors associated to the various cylinders.

Figure 8:
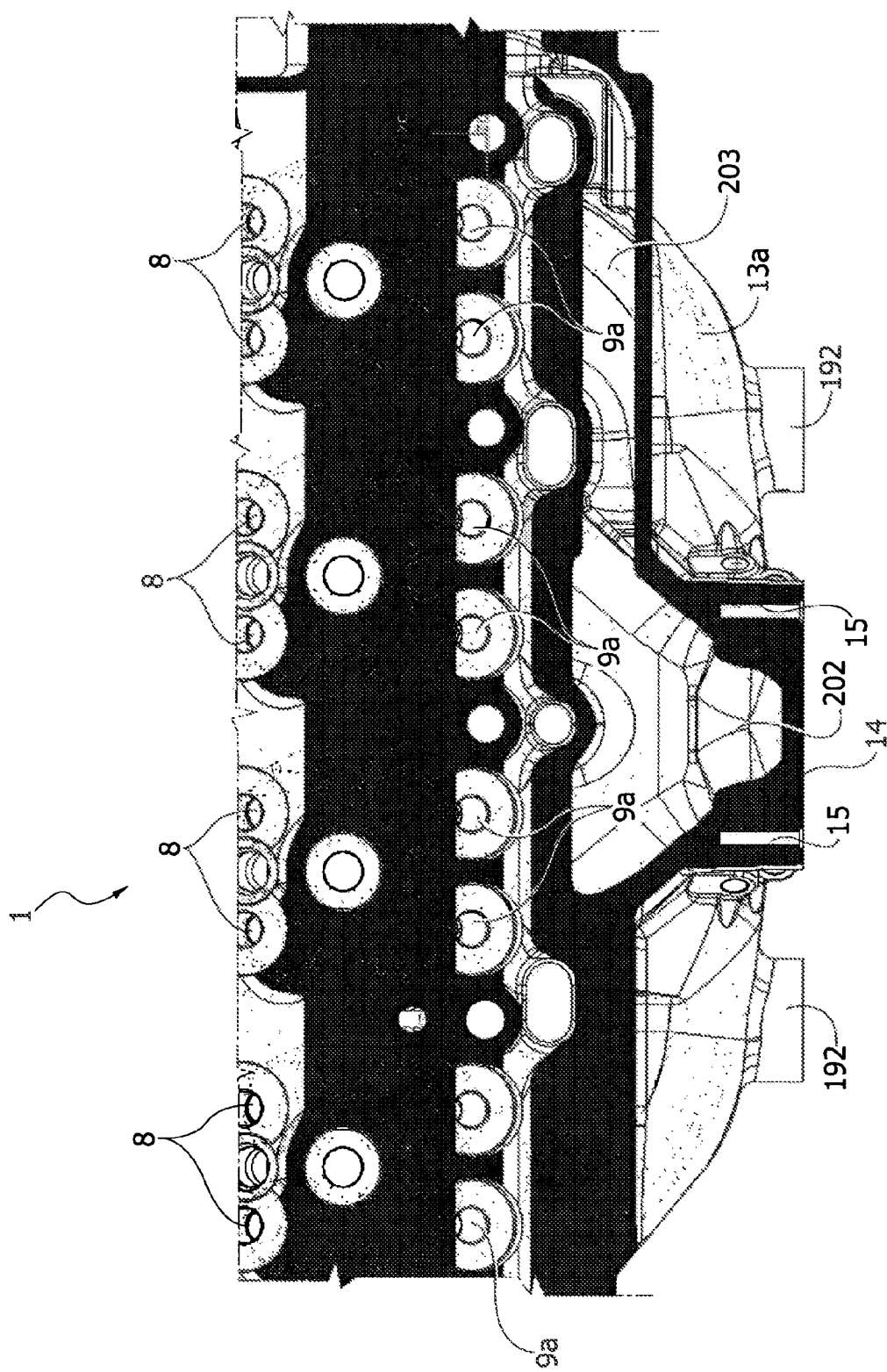
FIG. 8 is a sectional view according to line VIII-VIII of the FIG. 4.

FIGS. 6, 7, 8, show sections of the cylinder head in horizontal planes corresponding to lines VI-VI, VII-VII and VIII-VII of FIG. 4, i.e. substantially at the level of the lower subgroup 17 of exhaust conduits, at the level of the upper subgroup 16 of exhaust conduits, and at the level of the upper end part of the upper cooling jacket 19.

Figure 16:
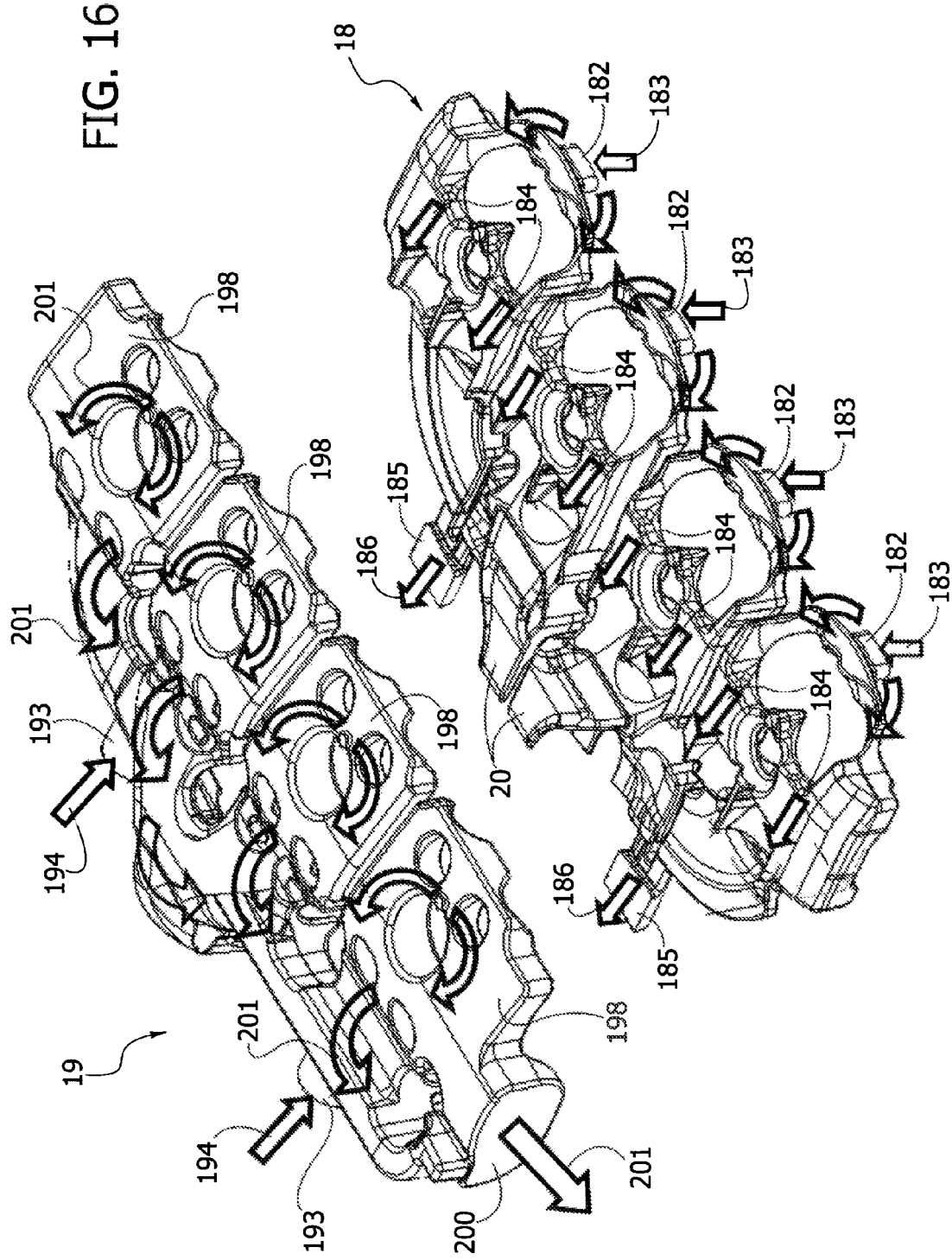
FIG. 16 illustrates a further exploded perspective view of the cores of FIGS. 14, 15.

Referring to FIG. 6, it is clearly observable that the lower cooling jacket 18 is longitudinally divided into four transverse chambers 180 by means of transverse partitions 181 provided in a single piece with the cylinder head. The transverse chambers 180 of the lower cooling jacket 18 are intended to receive cooling fluid from the circuit provided in the engine block by means of conduits distributed over the entire length of the cylinder head and provided starting from the lower face of the head respectively adjacent to the intake side and the exhaust side of the combustion chambers 7. FIG. 16 shows appendages 182 of the sand core used for obtaining some of the abovementioned communication conduits which allow the arrival—in the separate transverse chambers 180 of the lower cooling jacket 18—of cooling liquid coming from the circuit provided in the engine block, according to the arrows indicated with 183 in FIG. 16.

Due to the previously described arrangement, the cooling liquid coming from the engine block is forced to pass through the lower cooling jacket 18 traversing—parallel—the four transverse chambers 180, according to directions orthogonal to the longitudinal direction of the head, indicated by arrows 184 in FIG. 16. Thus, the cooling liquid which passes through the transverse chambers 180 reaches the exhaust side of the cylinder head cooling the walls of the subgroup 17 of exhaust conduits passing below such subgroup (with reference to the orientation of the drawings) and above them, in the portion 20 of the lower cooling jacket 18 (FIG. 5) interposed between the subgroup 17 and the subgroup 16 of exhaust conduits.

Figure 3:
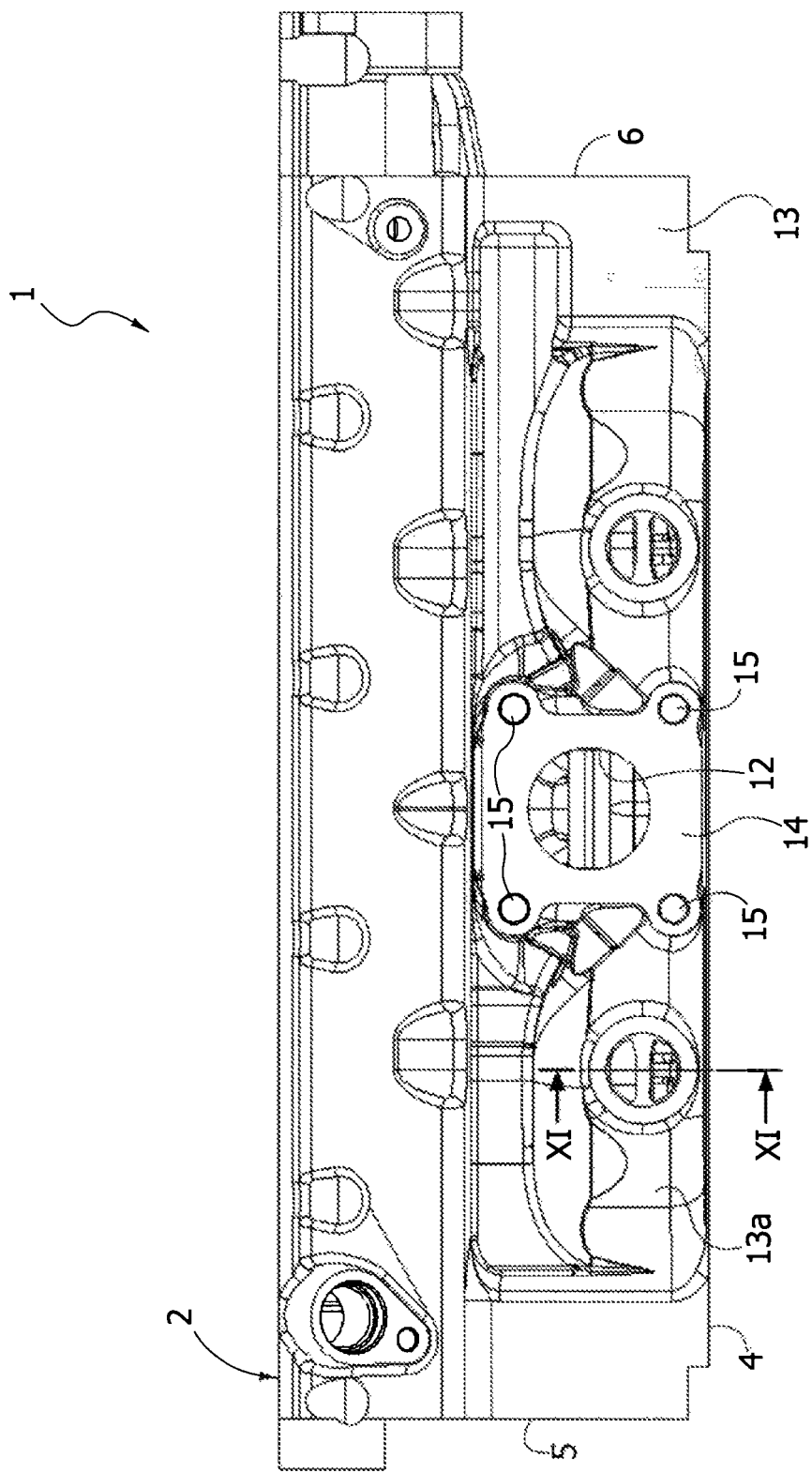
FIG. 3 is a side view of the cylinder head of FIGS. 1, 2.

The cooling liquid passes from the lower cooling jacket 18 to the upper cooling jacket 19 by means of a pair of conduits 190 (FIGS. 6, 11) defined by closing elements 191 which obstruct two tubular appendages 192 projecting from the face 13 of the cylinder head at the two sides of the central outlet 12 for the exhaust gases (also see FIG. 1). In FIGS. 1, 3, the closing elements 191 were omitted, so as to allow the edge of a partition 189 (FIG. 11) which separates the lower and upper cooling jackets 18, 19 to be observed. As clearly observable in FIG. 11, the closing element 191 is spaced from the front edge of the partition 189, so as to define the communication conduit 190.

In FIG. 16, reference number 18 indicates—in its entirety—the portion of sand core intended to define the lower cooling jacket 18 of the cylinder head according to the invention, while reference number 19 indicates the portion of the sand core intended to define the upper cooling jacket 19. The cylindrical cavities defined by the abovementioned tubular appendages 192 are obtained as a result of the cooperation between appendages 185 of the lower core portion and appendages 193 of the upper core portion, which have flat diametric coupling surfaces. Due to such arrangement, in the cylinder head according to the invention, the cooling liquid coming from the lower cooling jacket 18 arrives in the upper cooling jacket 19 through the abovementioned conduits 190, exiting from the lower jacket 18 in the direction of the arrows 186 of the FIG. 16 and returning into the upper jacket 19 following the direction of the arrows 194 of FIG. 16. A further communication between the lower cooling jacket 18 and upper cooling jacket 19 is provided for at areas 195 (FIG. 7) each arranged adjacent to the combustion chamber, between the two intake conduits.

Referring to FIG. 7, the upper cooling jacket 19 has one longitudinal conduit 196 in the area located immediately above the exhaust manifold, with a central bridge portion 197 (see the corresponding portion of the core 19 in FIG. 12) surrounding—at the upper part—the portion 16a of the subgroup 16 of exhaust conduits (also see FIG. 13).

Figure 12:
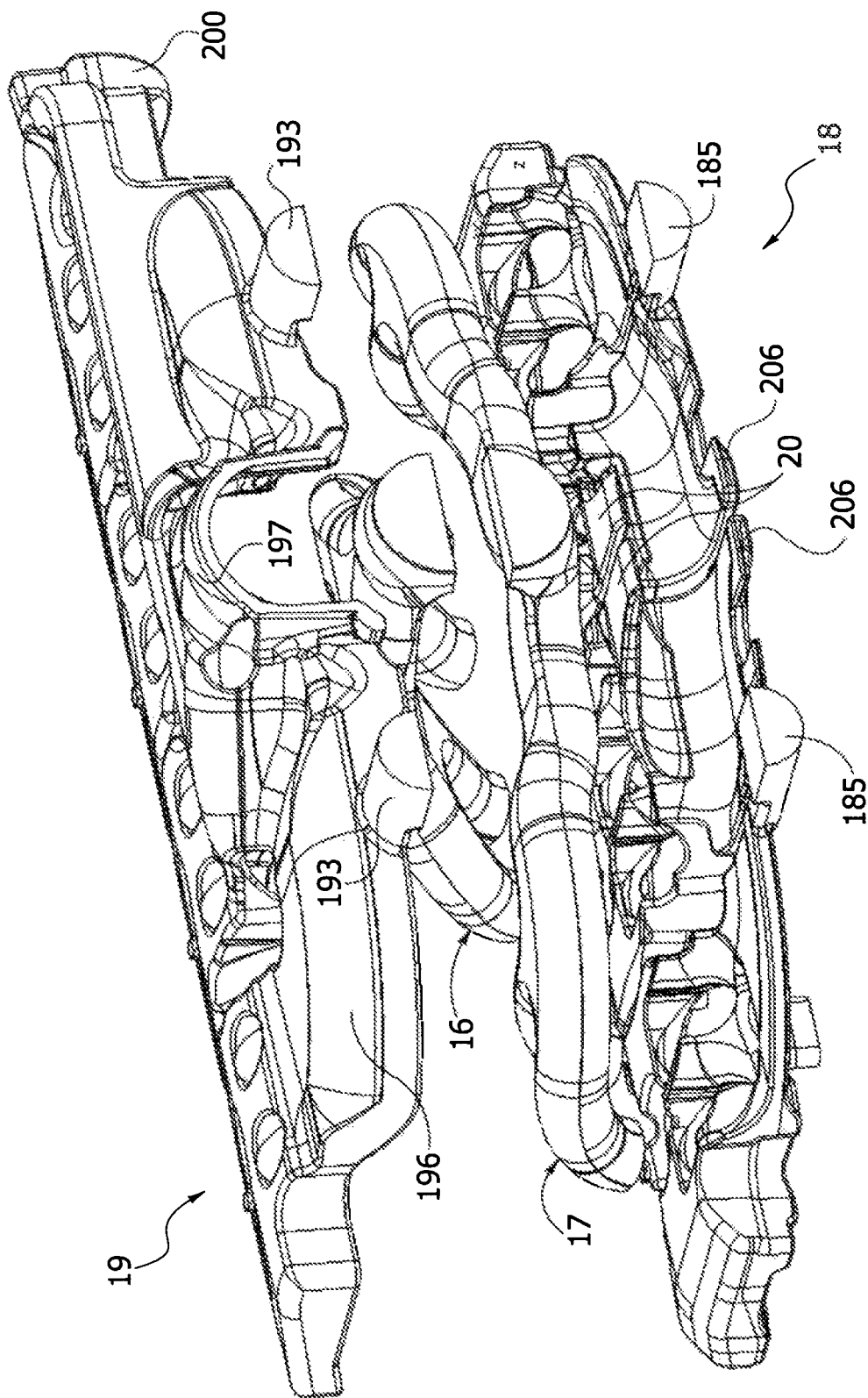
FIG. 12 is an exploded perspective view of the sand cores used for providing the exhaust conduits and the cooling jackets in the body of the cylinder head according to the invention.

Still referring to FIGS. 7 and 12, as well as FIG. 16, the upper cooling jacket 19 is also divided into separate transverse chambers 198 on the opposite side of the cylinder head, by means of partitions 199. Still referring to FIG. 7, the upper cooling jacket 19 communicates at the end face 6 of the cylinder head 1 with an outlet 200 of the cooling liquid from the head (also see the corresponding part of the sand core in FIG. 16). Only the upper cooling jacket 19 communicates with such outlet 200, so the liquid which passes through the transverse chambers 180 of the lower cooling jacket 18 is however forced to pass through the upper cooling jacket 19 before exiting from the head.

In FIG. 16, the arrows 201 indicate the direction followed by the cooling liquid within the upper cooling jacket and then to the outlet 200.

Figure 15:
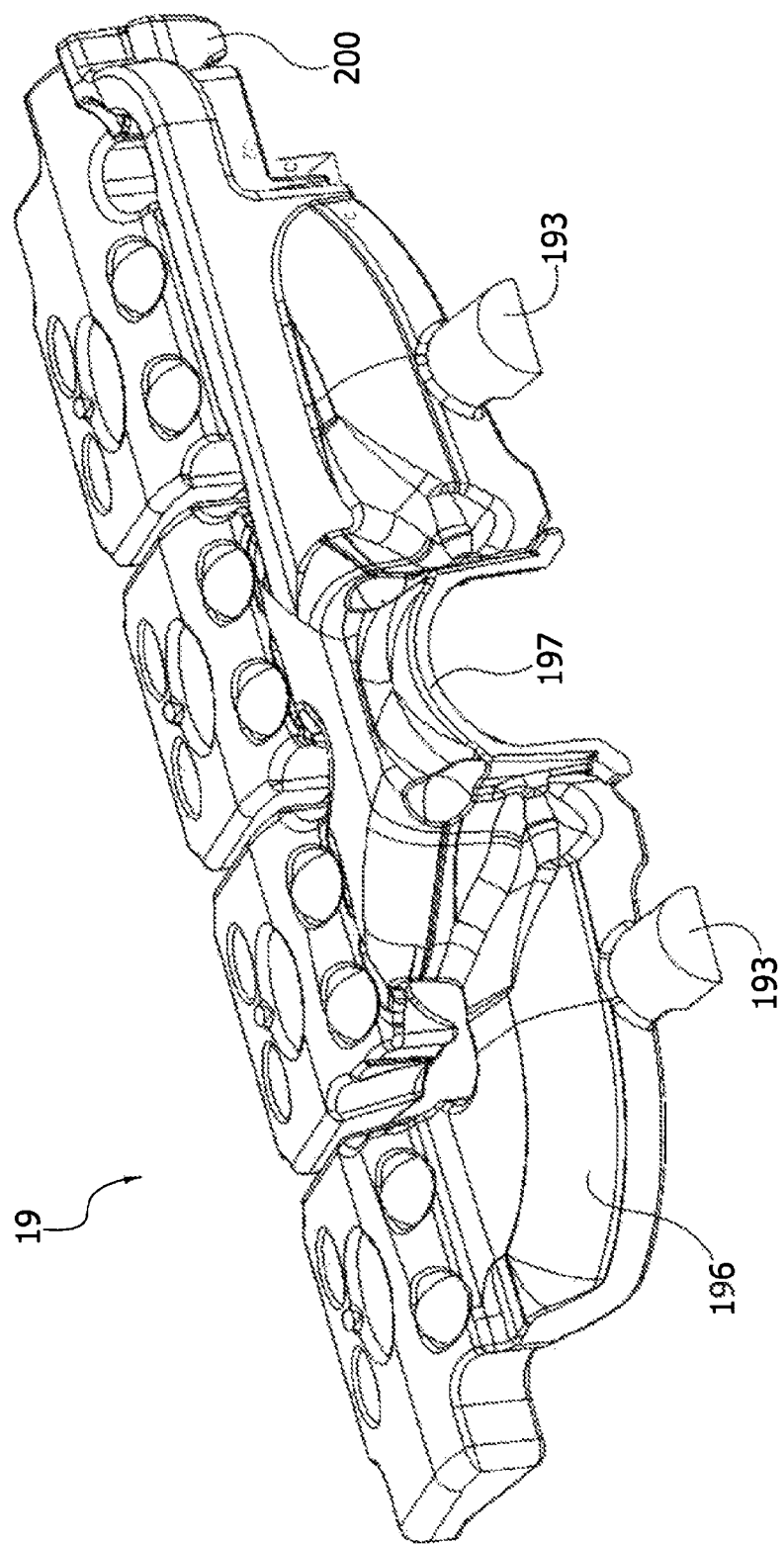

Referring to FIG. 8 and FIG. 15, the upper cooling jacket 19 has an upper end portion, with a part 202 located above the central outlet 12, and a channel 203 extended longitudinally from such portion 202 up to the outlet 200. Such upper portion of the upper cooling jacket 19 has the purpose of allowing the release of possible air bubbles which are contained in the cooling liquid and which tend to stop at the highest area of the cooling jacket of the cylinder head.

Figure 9:
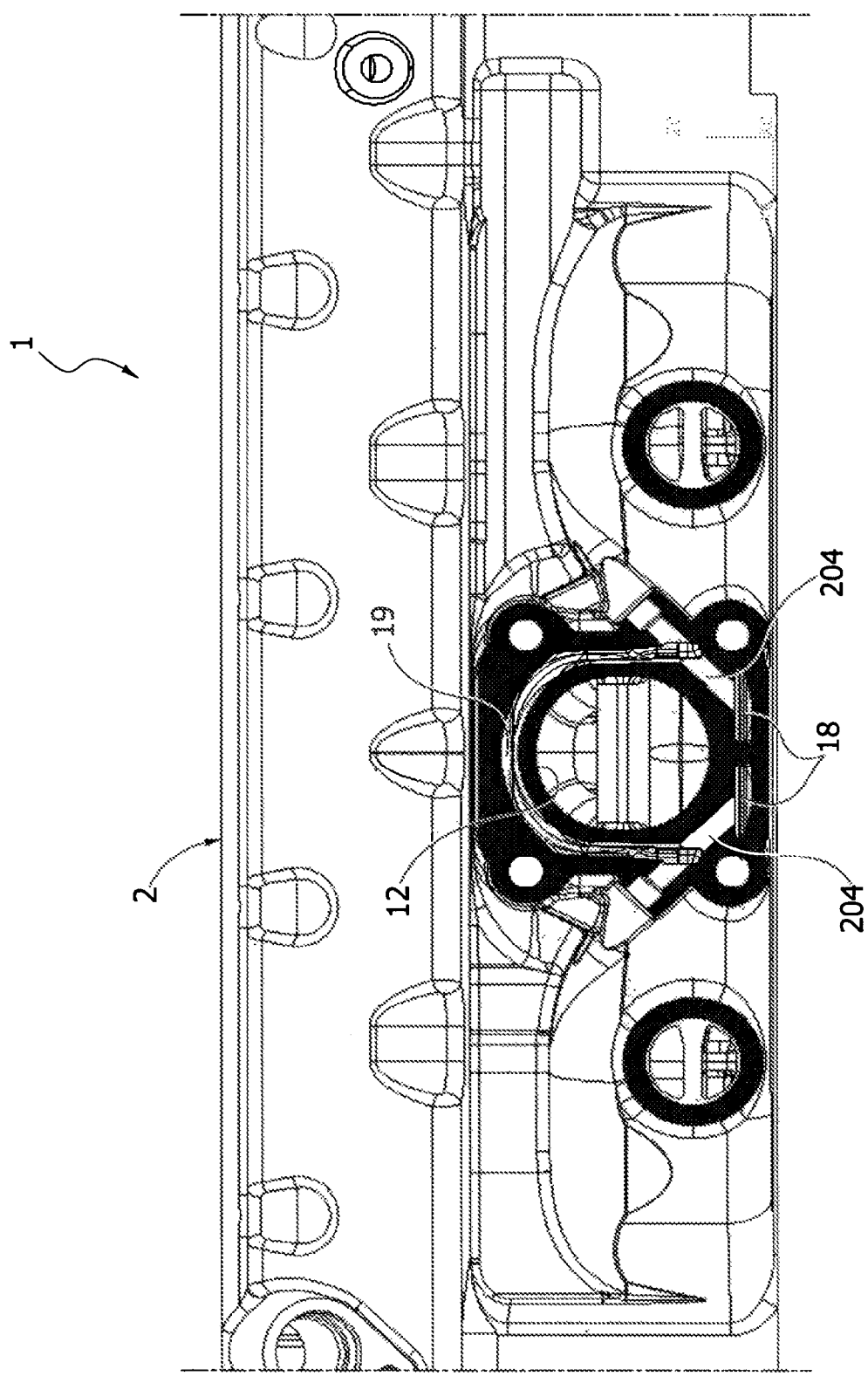
FIG. 9 is a sectional view according to line IX-IX of the FIG. 2.
Figure 10:
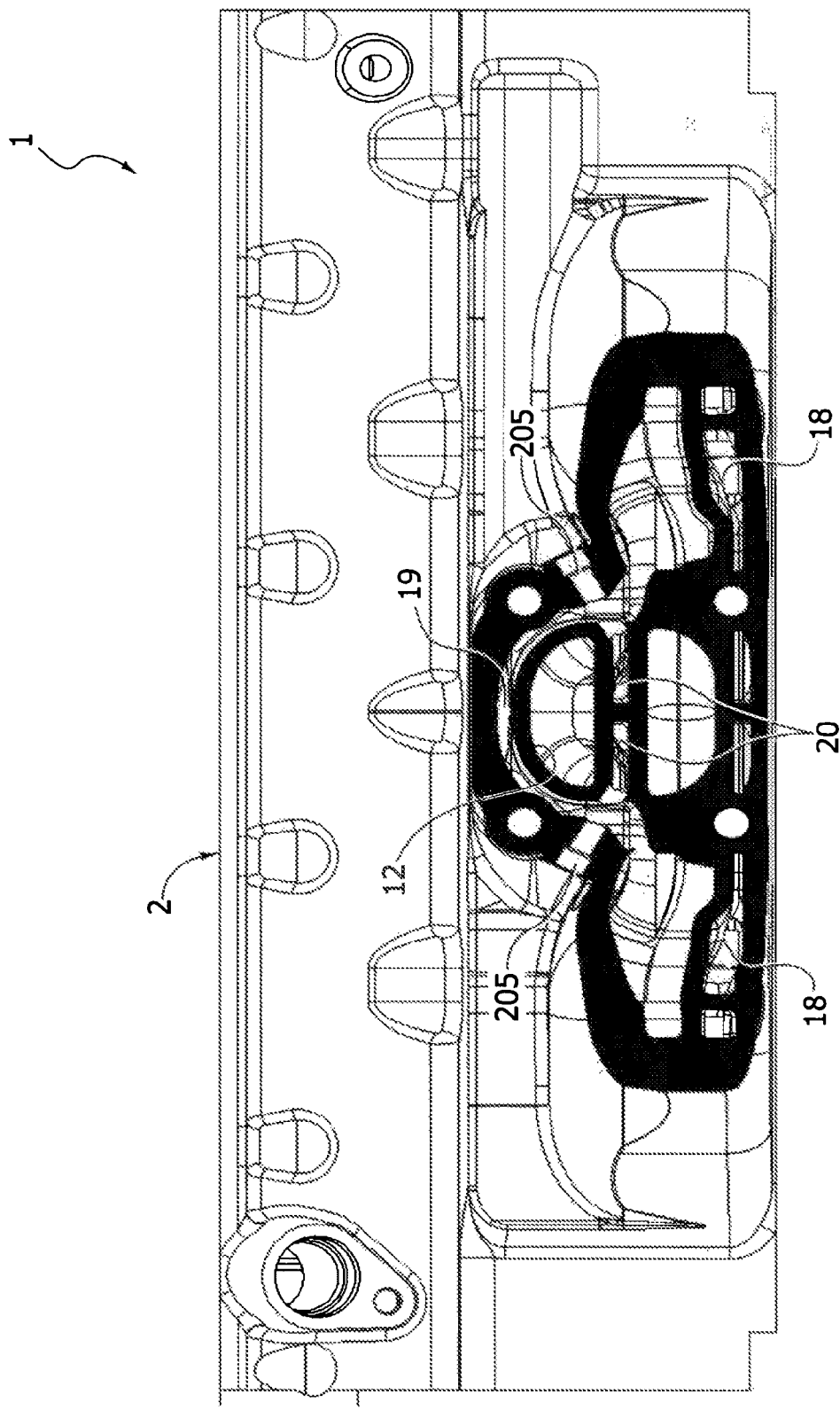
FIG. 10 is a sectional view according to line X-X of the FIG. 2.
Figure 11:
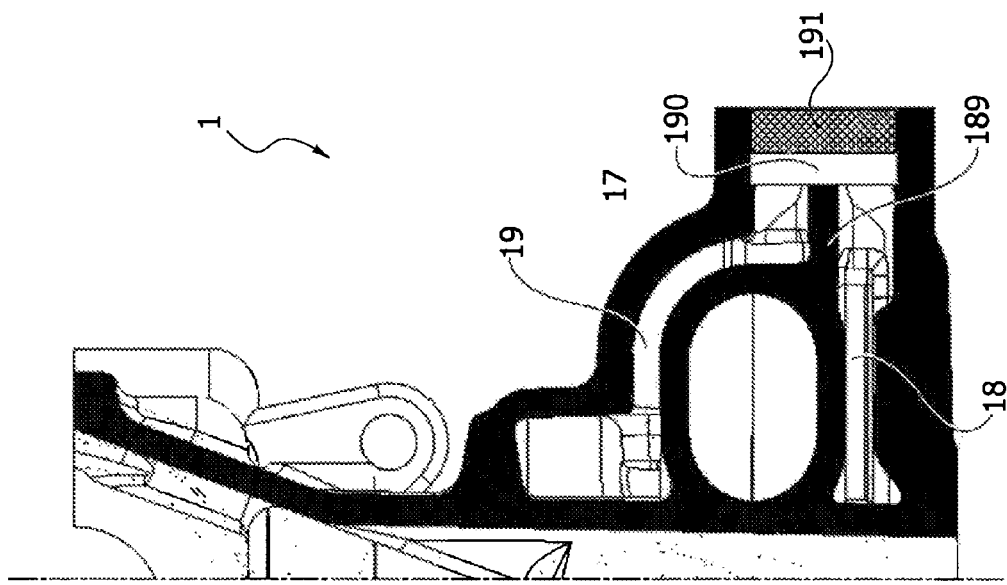
FIG. 11 is a sectional view according to line XI-XI, of the FIG. 3

Lastly, with reference to FIGS. 9, 10 the cylinder head according to the invention has two pairs of through holes 204, 205 which are provided in the cylinder head after casting and which have the purpose of placing the upper reference jacket 19 and the cooling jacket 18 in the area surrounding the outlet of the exhaust gas 12 in communication with respect to each other, so as to prevent the formation of dead areas with low circulation of the cooling liquid in such areas. As illustrated, the holes 204 place the two portions 206 (see the corresponding parts of the sand core in FIG. 12) of the lower cooling jacket 18 in communication with the sides of the bridge portion 197 of the upper cooling jacket 19 (FIGS. 9, 12). As clearly observable in FIG. 9, it should be observed that the lower jacket is however divided by a vertical partition below the outlet 12 for the gas, so as to prevent the creation of a continuous space surrounding the outlet 12. The holes 205 place the abovementioned bridge portion 197 of the upper cooling jacket in communication with the portions 20 of the lower cooling jacket which are extended between the subgroups of conduits 16, 17 (FIGS. 10, 12). As clearly observable in FIG. 10, a space surrounding the upper subgroup 16 alone in proximity of the outlet thereof and which is also however interrupted by a vertical partition below such outlet is also created at the holes 205.

As indicated above, FIGS. 12-16 indicate the sand cores which can be used for providing the cavities in the cylinder head according to the invention. FIG. 12 shows that the superimposed subgroups 16, 17 of exhaust conduits are obtained by means of separate core bodies which are mutually juxtaposed to form the body observable in FIG. 13.

As clear from the description above, the cylinder head according to the invention has the exhaust manifold integrated therein and comprises separate subgroups 16, 17 of exhaust conduits merging into manifold portions superimposed and spaced apart from each other. Furthermore, a lower cooling jacket which receives cooling liquid from the engine block through a plurality of openings distributed over the entire longitudinal dimension of the head is provided for so as to supply the cooling liquid to a plurality of separate transverse chambers 180 which are passed through—parallel—by the cooling liquid, transversely to the longitudinal direction of the head. The cooling liquid thus passes from the lower cooling jacket to the upper cooling jacket. The latter is passed through both transversely and longitudinally, up to the outlet of the cooling liquid at an end of the cylinder head.

The cylinder head according to the invention allows, due to the above-mentioned characteristics, combining the advantages of an exhaust manifold formed by superimposed and spaced subgroups of exhaust conduits, with the advantages in terms of more efficient cooling deriving from the specific configuration and arrangement of the cooling jackets. Simultaneously, the cylinder head according to the invention can be obtained in a relatively simple manner and at relatively low costs by providing the cores configured as described above.

Obviously, without prejudice to the principle of the invention, the construction details and embodiments may widely vary with respect to what has been described and illustrated purely by way of example, without departing from the scope of protection of the present invention.

What is claimed is:

1. Cylinder head for an internal combustion engine having:
   a body with an upper face, a lower face, two end faces and two lateral faces,
   said body integrating in a single cast piece, the engine exhaust manifold,
   said exhaust manifold being defined by a plurality of conduits for the exhaust gases provided in the body of the head, said conduits merging into a common outlet terminating on a lateral face of the head, and
   at least one lower cooling jacket and at least one upper cooling jacket provided in the body of the head, substantially below and above conduits defining the exhaust manifold,
   wherein:
   a) the lower cooling jacket is longitudinally divided into a plurality of separate transverse chambers associated to various engine cylinders, while the upper cooling jacket has a portion extended longitudinally over the entire extension of the head and communicating with separate transverse chambers located on the intake side of the head,
   b) said exhaust conduits integrated in the head form separate subgroups of exhaust conduits merging into manifold portions superimposed and spaced apart from each other,
   c) said separate subgroups of exhaust conduits terminate in said common outlet on a lateral face of the cylinder head, and
   d) the lower cooling jacket has a portion thereof which extends in the area of the body of the head, the portion separating the superimposed portions of the subgroups of exhaust conduits.

2. Cylinder head according to claim 1, further comprising holes, provided by means of a drilling operation in the casting, for placing the lower and upper cooling jacket in communication with each other in the areas at the two opposite and separate sides of the common outlet of the exhaust conduits.

* * * * *